United States Patent [19]

Bedzyk

[11] Patent Number: 5,210,648
[45] Date of Patent: May 11, 1993

[54] ADJUSTABLE MOUNT FOR CYLINDRICAL LENS WITH INDEPENDENT ROTATIONAL FEATURE

[75] Inventor: Mark Bedzyk, Rochester, N.Y.

[73] Assignee: Eastman Kodak Company, Rochester, N.Y.

[21] Appl. No.: 785,559

[22] Filed: Oct. 31, 1991

Related U.S. Application Data

[63] Continuation-in-part of Ser. No. 765,161, Sep. 24, 1991.

[51] Int. Cl.$^5$ ................................................ G02B 7/02
[52] U.S. Cl. .................................. 359/813; 359/819
[58] Field of Search ............... 359/813, 819, 820, 830, 359/808, 809, 827

[56] References Cited

U.S. PATENT DOCUMENTS

| | | | |
|---|---|---|---|
| 3,204,471 | 9/1965 | Rempel | 74/89 |
| 3,359,849 | 12/1967 | Friedman | 359/813 |
| 3,596,863 | 8/1971 | Kaspareck | 248/278 |
| 3,722,990 | 3/1973 | Vondran | 359/813 |
| 3,989,358 | 11/1976 | Melmoth | 350/247 |
| 4,077,722 | 3/1978 | Bicskei | 356/127 |
| 4,099,852 | 7/1978 | Kobierecki et al. | 350/247 |
| 4,408,830 | 10/1983 | Wutherich | 350/247 |
| 4,652,095 | 3/1987 | Mauro | 350/531 |
| 4,655,548 | 4/1987 | Jue | 350/245 |
| 4,769,803 | 9/1988 | Yamamia | 359/813 |
| 4,796,962 | 1/1989 | DeJager et al. | 350/6.8 |
| 4,838,649 | 6/1989 | Ichikawa | 359/813 |
| 4,909,599 | 3/1990 | Hanke et al. | 350/252 |
| 4,921,320 | 5/1990 | DeJager et al. | 350/6.8 |
| 4,962,079 | 10/1990 | Owens et al. | 346/108 |
| 4,982,206 | 1/1991 | Kessler et al. | 346/108 |

FOREIGN PATENT DOCUMENTS 0177815 4/1986 European Pat. Off. ............ 359/813

Primary Examiner—Eugene R. LaRoche
Assistant Examiner—A. Zarabian
Attorney, Agent, or Firm—Warren L. Franz; Frank Pincelli

[57] ABSTRACT

A lens mount for positioning a cylindrical lens in x, y, z and $\theta_x$, $\theta_y$, $\theta_z$ directional degrees of freedom includes a cylindrical carrier movable to a selected z axis position within a V-shaped channel track of a base including an elongated rail. The carrier has a radially extending bracket whose position relative to the rail is adjusted to rotate the carrier within the track channel to set the $\theta_z$ rotational direction position of a lens positioned with a planar x-y surface against a corresponding planar x-y end surface of the carrier. A fixture removably attached between the carrier and the retainer provides a push-pull mechanism which applies a biasing torque on the lens, to load opposite corners of the lens against guide pins of the carrier. A movable member on the detachable fixture adjusts the position of the retainer and lens translationally in the x or y magnification direction against the bias of the applied torque, independent of the $\theta_z$ rotational adjustment.

12 Claims, 3 Drawing Sheets

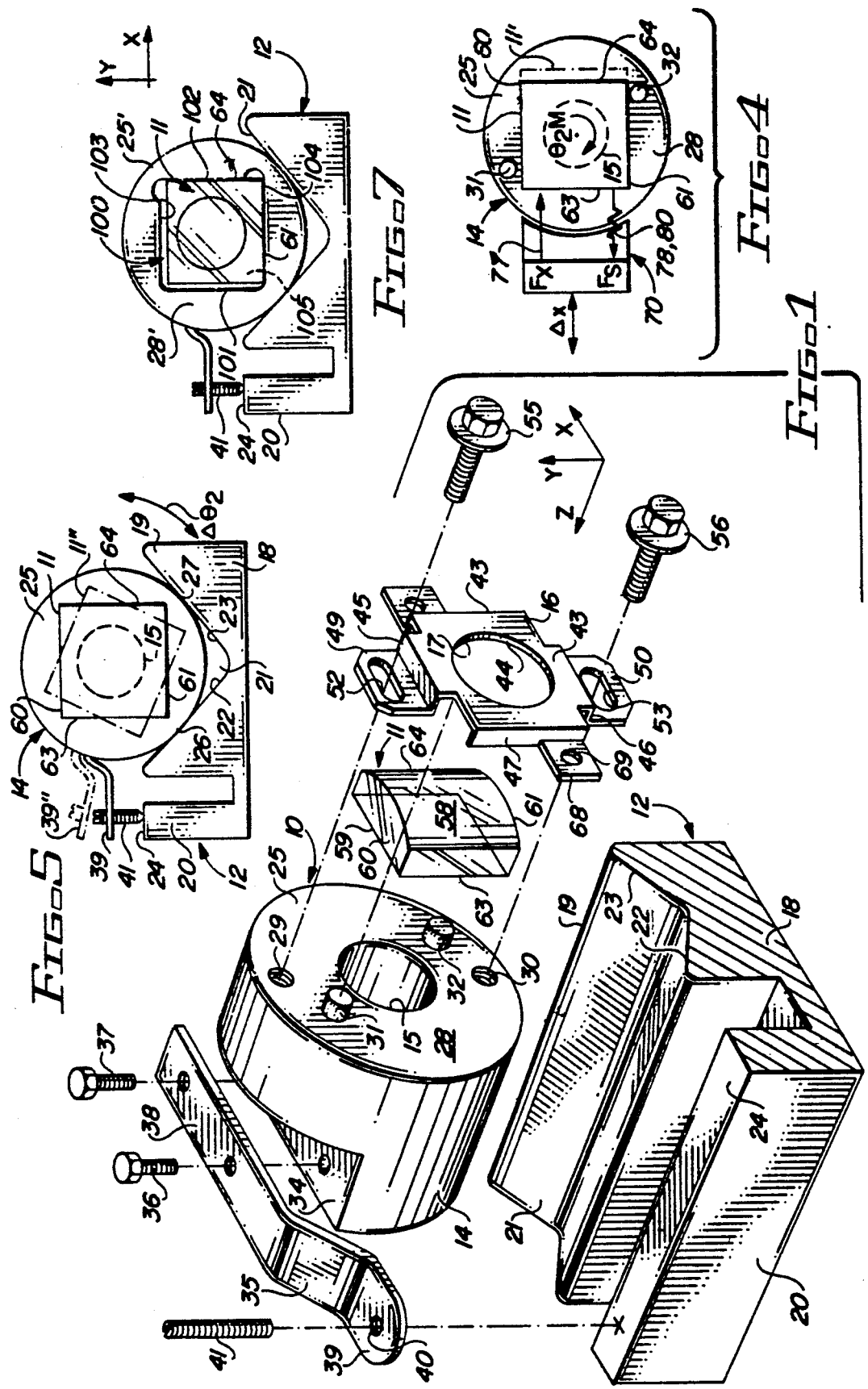

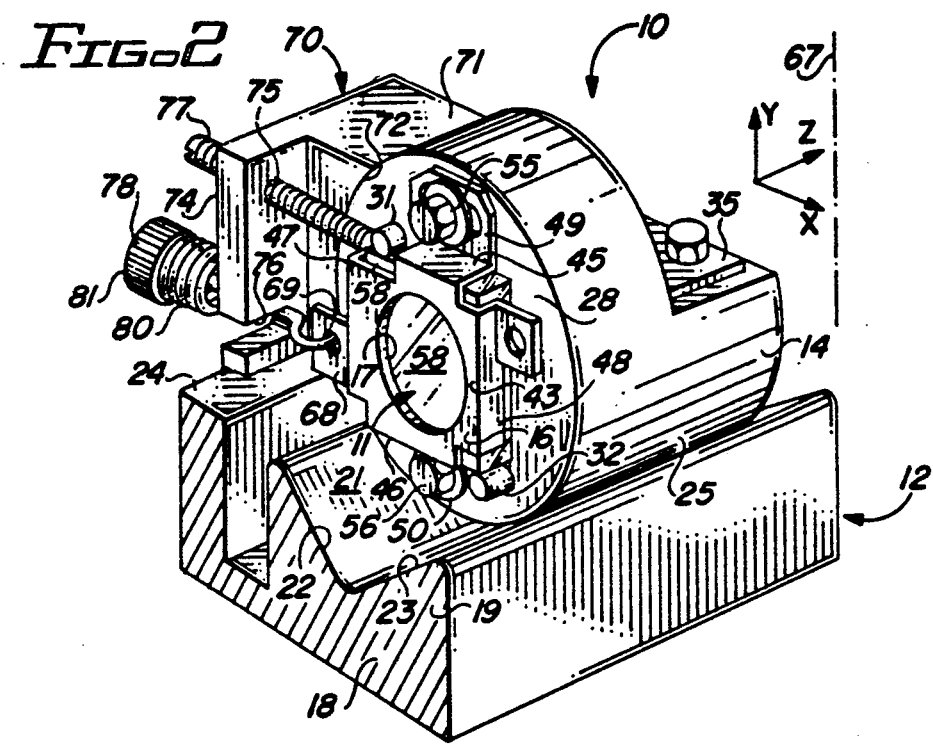
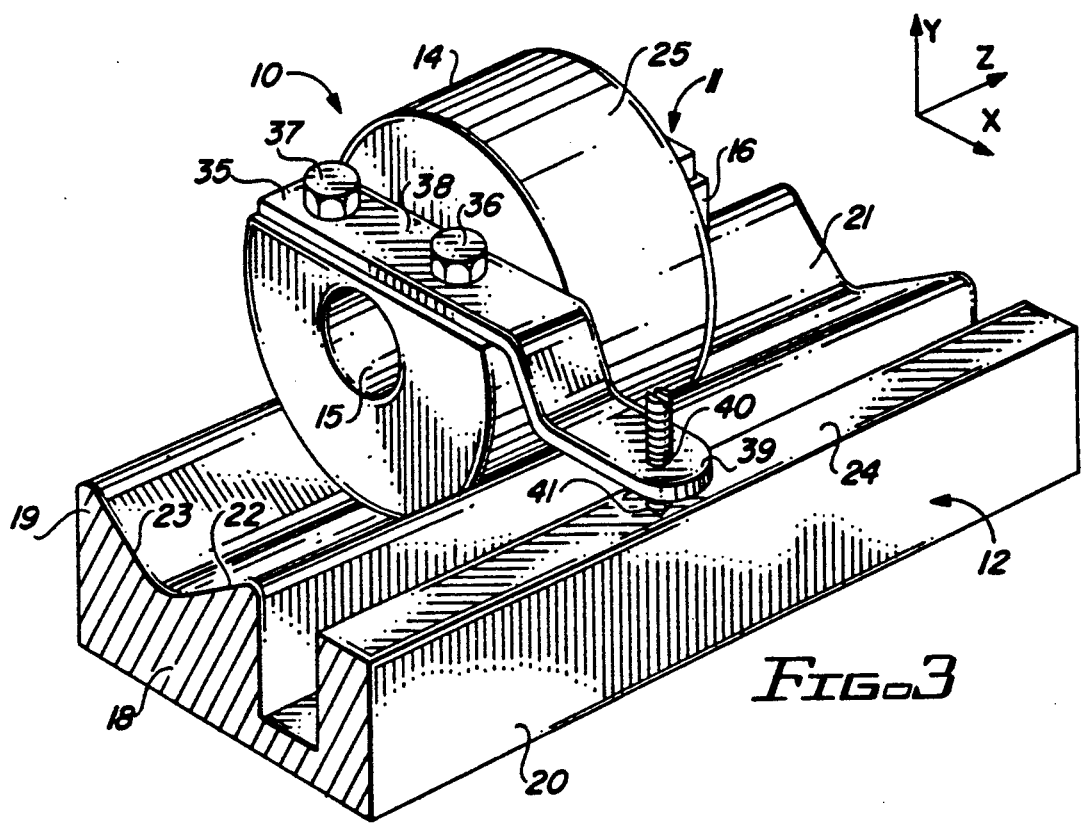

ADJUSTABLE MOUNT FOR CYLINDRICAL LENS WITH INDEPENDENT ROTATIONAL FEATURE

This is a continuation-in-part of U.S. patent application Ser. No. 07/765,161, filed Sep. 24, 1991, entitled "ADJUSTABLE MOUNT FOR CYLINDRICAL LENS." This application deals with subject matter similar to that of U.S. patent application Ser. No. 07/785,469, entitled "ADJUSTABLE MOUNT FOR CYLINDRICAL LENS WITH TORQUE APPLIED DIRECTLY TO LENS," filed on even date herewith, the disclosure of which is incorporated herein by reference pending.

TECHNICAL FIELD

This invention relates generally to a device for adjustably mounting an optical element in an optical system; and, in particular, to an improved device for mounting a cylindrical lens, independently adjustable in rotational $\theta_z$ and translational x or y and z directions, in an optical system like that of a laser printer.

BACKGROUND ART

The positioning of a lens, mirror or similar optical element (hereafter "lens") involves spatially locating such element in six degrees of freedom. The lens is located translationally relative to each of three orthogonal axes directions generally designated as the x(scan), y(cross-scan), and z(beam path) axes directions. The lens is also located rotationally relative to three rotational directions, generally designated as the $\theta_x$, $\theta_y$ and $\theta_z$ directions, corresponding to angular rotation, respectively, about each of the x, y and z axes.

Monolithic spherical lenses having one curved surface provide power magnification in two orthogonal directions x and y, and focus parallel rays at a focal point corresponding to the center of curvature of the lens surface. Such lenses are used in laser printers, e.g., for controlling beam spot size, convergence and focusing. Correct positioning of such spherical lenses in the x, y translational and $\theta_x$, $\theta_y$ rotational directions assures alignment of the focal point and center of the lens relative to an incident beam of light coincident with the z axis. Correct location of the lens along the z axis serves to assure proper focusing of an imaged object. Considerations for locating conjugate and composite spherical lens elements are similar.

Monolithic cylindrical lenses having one curved surface provide magnification in only one direction x or y and focus parallel rays to a line or lens cylinder axis parallel to the other direction y or x. Such lenses are used in laser printers, e.g., for beam shaping, such as for controlling x-direction or y-direction elliptical beam spot size. Cylindrical lenses may be manufactured to have a planar surface opposite the curved surface which is generally parallel to the x-y plane. Such a lens can, thus, be located in the $\theta_x$ and $\theta_y$ rotational directions by orienting the x-y planar surface normal to the incident beam z axis direction. Variations in positioning in the non-magnification direction (i.e. variations in the y direction for magnification in the x direction, and vice versa) are not critical. Thus, once correct orientation of the x-y planar surface is established, locational precision will be needed only in the x or y magnification translational and $\theta_z$ rotational directions. Location in the z direction is left adjustable for focusing purposes.

Traditional mounts for multiple degree of freedom positioning of optical elements nest multiple structural components for independent relative movement, one with respect to the other, to achieve the required translational and/or rotational positioning. U.S. Pat. No. 4,652,095, for example, describes an arrangement of three nested stages, each having a table shiftable along rails in a respective x, y or z translational direction by a threaded rod movable against the force of an opposing spring. The stages are nested, with the optical element mounted for movement with the table of the first stage, the first stage mounted for movement with the table of the second stage, and the second stage mounted for movement with the table of the third stage. U.S. Pat. No. 3,596,863 shows an arrangement of nested flexural pivots, each providing a respective $\theta x$, $\theta y$, or $\theta z$ rotational adjustment. Other examples of nested optical element mounting arrangements are given in U.S. Pat. Nos. 3,204,471; 4,077,722; 4,099,852; and 4,655,548.

Mounting arrangements that provide multiple degree of freedom lens positioning, without nesting, are shown in U.S. Pat. Nos. 3,989,358 and 4,408,830. The '358 patent provides independent x and y translational adjustments by micrometer spindles that are moved against knife-edges, displaced 90° circumferentially about a lens retaining ring. The '830 patent provides x, y and x-y translational adjustments by moving inclined faces of screw-driven cradle elements against corresponding angled corners of a rectangular lens retainer.

Conventional devices for achieving six-degree of freedom positioning of optical elements tend to be unduly complex and costly. Moreover, when used for mounting cylindrical lenses in optical systems like those of laser printers or the like, the precise machining utilized to ensure correct positioning in critical directions, is wasted when applied also for non-critical ones. In general, prior art mounts seek to avoid the exertion of any torque directly on the lens itself. See, e.g., U.S. Pat. No. 4,909,599.

Applicant's U.S. patent application Ser. No. 07/765,161, entitled "Adjustable Mount for Cylindrical Lens," filed Sep. 24, 1991, describes an inexpensive lens mount for positioning a cylindrical lens or similar optical element in an optical system like that of a laser printer, wherein six degree of freedom positioning is achieved with a minimum of nesting, taking advantage of physical characteristics of the lens, and employing a push-pull mechanism for applying a biasing torque on the lens, against which adjustments in the x or y axis magnification direction and $\theta_z$ rotational direction are made. The disclosure of that application is incorporated herein and made a part hereof by reference thereto.

In a preferred embodiment of the device described in the '161 application, $\theta_x$, $\theta_y$ positioning of the lens is achieved by abutting a planar surface, opposite a curved cylindrical surface, of the lens against a corresponding planar surface of an oversized cavity of a lens carrier. The carrier includes planar pads that load up against corresponding planar surfaces of a railed base member of the optical system supporting structure to assure that the cavity planar surface is oriented in the x-y vertical plane. Positioning in the y or x axis non-magnification direction is non-critical and is achieved by other elements in the carrier cavity. Positioning in the x or y axis magnification direction is achieved by fitting planar edge surfaces of the lens in abutment with corresponding planar edge surfaces of a cavity of a lens retaining member, and utilizing a push-pull mechanism to shift the retainer in the magnification direction relative to the lens carrier. The same push-pull mechanism operates to bias the lens clockwise in the $\theta_z$ rotational direction about a pivot point provided in the carrier cavity. Rotational positioning in the $\theta_z$ direction is accomplished by moving a member into the carrier cavity into contact with the lens, to pivot the lens about the same pivot point in opposition to the biasing torque. Means for adjusting the lens in the z axis focus direction in the disclosed embodiment comprises a mechanism for locking the lens carrier in selected position along a rail directed in the z axis direction. Fasteners, threaded through aligned bores of the retainer and carrier, serve to lock the lens after making the x or y and $\theta_z$ adjustments. Those bores are elongated in the x or y magnification direction in the retainer to permit movement of the retainer in that direction relative to the carrier.

The '161 device utilizes a carrier having an internal cavity into which locator pins protrude, and a retainer having an internal cavity that holds the lens, and against which a push-pull mechanism acts to apply a torque to the lens. The push-pull mechanism is an integral part of the mount, so every mount has its own such mechanism. Because the $\theta_z$ position locator pin serves to stabilize the lens during translational movement, the translational x or y magnification direction adjustment is done after the $\theta_z$ angular positioning adjustment is made. The present invention simplifies the structure of the device shown in the '161 application, and applies a push-pull action using a fixture that can be detached for other use on other lens mounts. Moreover, the means for accomplishing rotational $\theta_z$ adjustment is made independent of the means for accomplishing translational x or y adjustment, so rotational and translational adjustments can be made in any order.

DISCLOSURE OF THE INVENTION

It is an object of the present invention to provide an improved inexpensive lens mount for positioning a cylindrical lens or similar optical element in six degrees of freedom, providing precise translational adjustment in the x or y axis magnification direction, as well as precise rotational adjustment in the $\theta_z$ rotational direction.

It is another object of the invention to provide an inexpensive lens mount for the six degree of freedom positioning of a cylindrical lens, that employs similar principles similar to those employed with the lens mount of Applicant's U.S. patent application Ser. No. 07/765,161, which utilizes a detachable fixture to provide a push-pull action.

It is another object of the invention to provide an inexpensive cylindrical lens mount, similar to that of the '161 application, which has independently acting means for making a $\theta_z$ rotational adjustment and means for making an x or y translational adjustment.

In accordance with the invention, a device is provided for positioning a cylindrical lens, or similar optical element, translationally with respect to x, y, z orthogonal axes directions and angularly relative to $\theta_x$, $\theta_y$, $\theta_z$ directions respectively rotationally about the x, y, z axes directions. The device includes detachable means for directly applying a biasing force on the lens in the x or y axis magnification direction using a push-pull mechanism to load opposite sides of the lens against opposite locating pins; and means for adjustably locating the lens translationally in the x or y axis magnification direction against the applied biasing force. The device further includes means for adjustably locating the lens in the $\theta_z$ rotational and z translational directions, independent of the action of the push-pull mechanism.

In a preferred embodiment described in greater detail below, as with the embodiments disclosed in the '161 application, $\theta_x$, $\theta_y$ positioning is achieved utilizing a lens retainer to abut a planar surface of the lens against a corresponding planar surface of a lens carrier. However, unlike the '161 application arrangements wherein the carrier planar surface is formed in a lens receiving cavity in the carrier, the carrier planar surface in the preferred embodiment herein is an external surface and no lens receiving cavity is needed. The lens is pressured against this surface by a retainer which encompasses the lens and can be locked down after correct positioning has been achieved. A detachable fixture is utilized to employ a push-pull mechanism to apply a biasing moment to the retainer, to load the lens against guide pins on the carrier and to apply a biasing force in the x or y axis magnification direction. The carrier advantageously takes the form of a cylindrical member locate within an elongated track, aligned in the z axis direction. Rotational adjustment in the $\theta_z$ direction is accomplished by moving a $\theta_z$ locating pin relative to a reference surface, to pivot the carrier and lens about the z axis direction within the track. Translational adjustment in the x or y axis magnification direction is accomplished by moving an x or y locating pin on the detachable fixture against the retainer, to translate the lens along the guide pins, in opposition to the applied biasing force. Fasteners, threaded through aligned bores of the retainer and carrier, serve to lock the retainer and lens in position relative to the carrier after making the x or y adjustment. Potting or clamping is used to fix the carrier relative to the track after making $\theta_z$ and z axis direction adjustments.

The lens mount of the invention provides a device for positioning a cylindrical lens in six degrees of freedom, in an inexpensive way, utilizing precise machining only where needed, and with biasing and translational locating mechanisms applied with a detachable fixture. Positioning in the $\theta_z$ rotational direction is achieved utilizing a cylindrical carrier located in a walled track, for translation along and rotation about the z axis direction.

BRIEF DESCRIPTION OF THE DRAWINGS

Embodiments of the invention have been chosen for purposes of illustration and description, and are shown in the accompanying drawings, wherein:

FIG. 1 is an exploded perspective view of a cylindrical lens mount in accordance with the invention;

FIG. 2 is a front perspective view of the mount of FIG. 1, showing the detachable push-pull mechanism attached;

FIG. 3 is a rear perspective view of the mount of FIG. 1;

FIGS. 4 and 5 are schematic views helpful in understanding the operation of the mount of FIGS. 1-3; and FIGS. 6 and 7 are front perspective and plan views, respectively, showing a modified form of lens mount in accordance with the invention.

Throughout the drawings, like elements are referred to by like numerals.

MODE OF CARRYING OUT THE INVENTION

Figure 6:
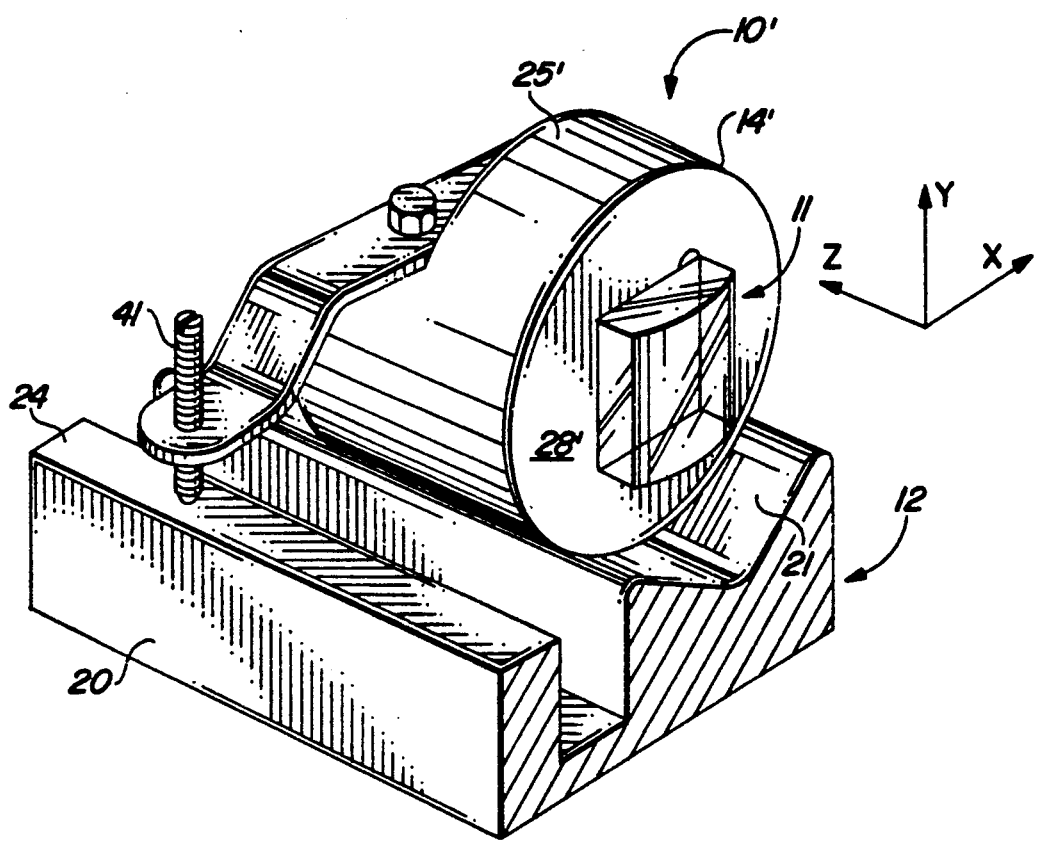

The principles of the invention are illustrated with reference to an exemplary device 10, suitable for positioning a cylindrical lens 11 or the like optical element translationally with respect to x, y, z orthogonal axes directions and rotationally with respect to $\theta_x$, $\theta_y$, $\theta_z$ directions in an optical system, such as that of a laser printer, described in Applicant's U.S. patent application Ser. No. 07/765,161.

A typical optical system of the type to which the invention finds application includes an optical head for projecting a beam of laser light along an optical beam path coincident with a z axis direction. The beam is modulated in accordance with information received from an image signal generating circuit, and scanned line-by-line in an x axis (scan) direction by means of a rotating polygon onto a photosensitive film or other similar receiving medium. The medium is in turn moved in a y axis (cross-scan) direction by means of a rotating drum or the like. A start-of-scan detector controls the timing of the light beam modulation. Optical elements, including cylindrical lenses like the lens 11, are positioned between the optical head and the mirrored multiple facets of the polygon to control beam shaping, focusing and direction. Other optical elements, located between the polygon and the drum, correct for differences in beam focus due to the f-$\theta$ condition and focus the image in the cross-scan direction to avoid objectionable banding artifacts due to facet out-of-plane wobble and pyramid angle errors. Additional details concerning the functioning and operation of laser printers are given in U.S. patent application Ser. No. 637,429, entitled "Laser Printing," filed Jan. 1, 1991, and in U.S. Pat. Nos. 4,397,521; 4,796,962; 4,982,206; and 4,921,320.

The mount 10 (FIGS. 1-3) is suitable to locate the cylindrical lens 11 for use in shaping the elliptical form of the scanning beam in either the x or y axis direction and for controlling its $\theta_z$ angular orientation. The illustrated lens 11 is mounted with its magnification (or curvature) direction being in the x axis direction (FIG. 1). Those skilled in the art to which the invention relates will, however, appreciate that the same principles apply for mounting a lens having a y axis magnification direction.

The mount 10 comprises a base 12 elongated in the z axis direction, a lens carrier 14 including a central optical opening 15, and a lens retainer 16 including a corresponding opening 17. The opening 15 is a circular opening formed concentrically parallel with the z axis. The opening 17 is similarly configured.

The base 18 consists of a V-shaped track 19 and a flat rail 20. Base 18 may be an integral part of a stationary structure that supports all of the components of the optical assembly. The track 19 has an upwardly-opening V-shaped channel 21 formed by symmetrical, downwardly converging, opposing longitudinal surfaces 22, 23. The channel 21 extends longitudinally in the z axis direction. The rail 20 has a horizontal top surface 24, laterally spaced from channel 21 and likewise longitudinally extending in the z axis direction. Both the track 19 and rail 20 are formed to have uniform lateral cross-sections throughout their lengths.

The illustrated carrier 14 is configured for adjustable attachment translationally in the z axis direction and rotationally in the $\theta_z$ direction within the channel 21 of track 19. The carrier 14 comprises a generally cylindrical body member 25 of outside diameter chosen to rest the body 25 tangentially at opposite lines of contact 26, 27 (see FIG. 5) midway up the walls 22, 23 of channel 21 of track 19. The body 25 and channel 21 are relatively dimensioned, configured and adapted so that the center of the opening 15 will coincide with the center of the beam of the optical system. The front end of the body 25 is formed with a planar surface 28, formed normal to the body cylindrical axis, so that when the member 25 is placed within the channel 21, the surface 28 will be parallel to the x-y plane of the optical system. Two z axis directed, threaded bores 29, 30 (FIG. 1) open onto the surface 28, radially spaced in diametrically opposed positions, above and below the opening 15. To the left and right of the bores 29, 30, and closer in at diametrically opposed positions relative to the opening 15, are respectively located z axis directed fixed pins 31, 32, where function is further described below.

The rear portion of the member 25 is cut away in an upper region above the opening 15 to provide a horizontally extending, mounting surface 34 onto which a laterally extending bracket 35 is received by means of fasteners 36, 37 (FIG. 1). The bracket 35 includes an inner part 38 which is brought into abutment over the surface 34, and an outer part 39 joined to the part 38 and extending generally horizontally out over the surface 24 of the rail 20, radially relative to the opening 15. The part 39 includes a vertically directed, threaded bore 40 into which threaded pin 41 is received. The pin 41, bracket 35, body member 25, channel 21 and rail 20 are relatively dimensioned, configured and adapted so that the point of the pin 41 will contact the rail upper surface 24, and threading the pin 41 into or out of the bore 40 will lower or raise the bracket part 39 relative to the rail 20, thereby rotating the member 25 clockwise or counterclockwise (as seen in FIGS. 1, 2 and 5) in the $\theta_z$ rotational direction.

The lens retainer 16 (FIGS. 1 and 2) is of thin, generally rectangular plate construction comprising front and rear planar vertical faces 43, 44 between which the opening 17 extends and upper, lower, left side and right side z axis directed marginal edge pieces 45, 46, 47, 48. The edges 45, 46 have inside planar surfaces which are parallel to the x-z plane and the edges 47, 48 have inside planar surfaces which are parallel to the y-z plane. Those inside surfaces, together with the rear surface 44, define a rearwardly-facing rectangular recess into which the lens 11 can be snugly received. Tabs 49, 50 project respectively upwardly and downwardly, vertically from the free ends of edge pieces 45, 46. Bores 52, 53 (FIG. 1) extend through the tabs 49, 50. The bores 52, 53 are smooth and elongated in the horizontal x axis direction. The vertical spacing between bores 52, 53 matches the vertical spacing of the corresponding bores 29, 30 located above and below the opening 15 of the carrier 14. Screws 55, 56 (FIGS. 1 and 2) are respectively passed through the bores 52, 53 and threaded into the bores 29, 30, bringing the tabs 49, 50 of retainer 16 into proximity with the surface 28 of the carrier 14. The retainer 16 is dimensioned, configured and adapted so that, with the curved surface 58 of lens 11 positioned adjacent the retainer surface 44, the plano surface 59 of lens 11 will be brought into planar abutment with the carrier planar surface 28. The elongation of bores 52, 53 in the x axis direction permits the retainer 16 (and the lens 11 received therein) to be shifted translationally in the x axis direction with the screws 55, 56 loosely received within the bores 52, 29 and 53, 30. The left edge 47 of the retainer 16 includes a leftwardly-directed tab 68 including a bore 69, whose purpose is described further below.

The lens 11 (see FIGS. 1, 4 and 5) has upper and lower horizontal x-z planar cut edges 60, 61 and left and right vertical y-z planar cut edges 63, 64. The particular lens 11, shown for illustrative purposes, is of a convex plano construction, having a convex front surface 58 and an x-y planar rear surface 59. The surface 58 is cylindrically contoured to provide curvature (i.e. magnification) in the x axis direction, but uniformity (i.e. no magnification) in the y axis direction. The contour of the convex surface 58 has a cylindrical curvature centered about a lens cylindrical axis 67 indicated in FIG. 2. The lens 11 acts to provide magnification in the x axis direction only, so can be used to control the x axis direction extent of the spot size of a laser elliptical scanning beam directed along the z axis toward the lens 11.

Ideally, lens 11 is shaped so that the cylindrical axis 67 of surface 58 is coincident with the midpoints of the x axis extents of the edges 60, 61 and is parallel to the y-z planes of the edges 63, 64. However, most lenses are not ideal. The mount 10, therefore, has a purpose of assuring that the lens axis 67 of cylindrical surface 58 will be precisely aligned with the incident optical beam in the y-z plane. Slight variations in translational alignment of lens 11 in the y axis (non-magnification) direction will have little effect, since magnification occurs in the x axis direction only. Alignment in the z axis direction affects focusing only and will be adequately accommodated by shifting the position of the cylinder body 25 of the carrier 14 longitudinally within the channel 21 of the track 19. Of greatest concern, therefore, are adjustments in the x axis (magnification) translational and $\theta_z$ rotational directions. Positioning for $\theta_y$ and $\theta_x$ rotation is accomplished by assuring that the plano surface 59 (orthogonally cut relative to the edges 60, 61 and 63, 64) is in alignment with the x-y plane of the optical system. This is done by shaping the front end surface 28 of carrier 14 to be vertically planar in the x-y plane, as already described.

Unlike the carrier in the '161 patent application arrangements, carrier 14 does not include integrally therewith a push-pull mechanism for applying a biasing torque on and for translationally shifting the lens-holding retainer 16. Here, that function is performed by a separate detachable fixture 70, shown in FIG. 2. Fixture 70 includes a main body portion 71 having a right side, concave surface 72 that complements and can be removably abutted against the left of the cylindrical surface of the carrier body member 25. The left side of the portion 71 includes a rectangular forward extension 74 having an upper bore 75 and a lower slot 76, both horizontally directed in the x axis direction, and through which a threaded screw 77 and an elongated hook member 78 are respectively passed. The bore 75 is threaded and sized to match the external threading on the shank of the screw 77. The tip of the screw 77 is made non-abrasive and is located so that it contacts the edge 47 of the retainer 16. The slot 76 is smooth and is elongated toward a front opening in the z axis direction by means of which the hook member 78 may be brought into the slot 76. The slot 76 is oversized in both the y and z axis directions to permit free axial movement of the shank of member 78 in the x axis direction and diagonal vertical tilting of the shank in the $\theta_z$ direction within the confines of slot 76. The right end of member 78 is formed in the shape of a hook 79 which has a rearwardly directed free end that can be removably secured to retainer 16 by passing it through bore 69. A compression spring 80 is located about the shank of the member 78, between the left side of the extension 74 and the enlargement of a head 81 of the member, to exert a leftwardly-directed force on the hook end 79 and, thus, on the tab 68.

As shown in FIGS. 1 and 2, the plano surface 59 of the cylindrical lens 11 is pressured in the z axis direction against the x-y planar surface 28 of the cylindrical body member 25 of lens carrier 14. This positions the lens 11 in the $\theta_x$ and $\theta_y$ rotational directions sufficiently for laser printer beam shaping applications without the need for adjustment. The pressure is provided using screws 55, 56 passing through bores 52, 53 and into bores 29, 30, to urge the retainer 16, holding lens 11, toward the surface 28.

In operation, as indicated schematically in FIGS. 4 and 5, x axis magnification direction translational and $\theta_z$ direction rotational adjustments are accomplished independently, and in any order. To make the translational x axis direction adjustment, the detachable push-pull mechanism fixture 70 is brought alongside the carrier body member 25 (FIG. 4), with the tip of threaded pin 77 contacting the edge 47 of retainer 16 adjacent its top left corner, and the hook end 79 of member 78 connecting to tab 68 of edge 47 of retainer 16 adjacent its bottom left corner. This push-pull action on retainer 16 results in a clockwise moment $\theta_z M$ being applied to the lens 11 by the force $F_s$ of the spring 80 acting against the pivot point provided by the tip of pin 77. The resulting torque loads the lens 11 against the fixed pins 31, 32 which are located proximate diagonally opposite corners of the lens 11 and are vertically spaced to leave a gap equal to the vertical spacing of the lens edges 60, 61. For the shown embodiment, the x direction extents of retainer edges 45, 46 are chosen to leave openings for the pins 31, 32 to contact the lens 11 directly. Edge 60 is urged upwardly against pin 31 and edge 61 is urged downwardly against pin 32, preventing $\theta_z$ rotation of lens 11 relative to carrier 14. The biasing action of spring 80 also forces the lens 11 in the x axis direction against the tip of screw 77, thus, also providing a biasing force in the x axis direction. Adjustment of the position of lens 11 in the x axis (magnification) translational direction is, therefore, made against the biasing force of spring 80 by threading the screw 77 in or out of the bore 73. Advancing the screw 77 in the x axis direction will move the retainer 16 (and, thus, lens 11) in the x axis direction to set the x position of the lens 11. Increasing the length of screw 77 between the extension 74 and the retainer edge 47, for example, will move the retainer from a position 11 (shown in solid lines in FIG. 4) to a position 11' (indicated in dot-dashed lines). The lens 11 will remain loaded against the guide pins 31, 32 during this action. Once the x axis position has been set, screws 55, 56 are fully tightened down to lock retainer 16 and lens 11 against further movement relative to carrier 14. A clockwise moment is chosen to load the lens 11 against the pins 31, 32, so that standard right-hand threaded lockdown screws 55, 56 will not dislodge the lens 11 from its adjusted position during lockdown After the screws 55, 56 have been tightened, the fixture 70 can be removed and used for making the x or y magnification direction translational adjustments for other lens mounts. Because the push-pull mechanism is located on a removable element, transferable between mounts, the carrier 14 can be made much more simply than that shown in the '161 application.

The $\theta_z$ rotational adjustment is made, as shown in FIG. 5, by adjusting the screw 41 within the bore 40 of bracket 35 (FIG. 1) to rotate the radial part 39, and thus the cylinder body 25 of the carrier 14, about the z axis, within the confines of the track channel 21. This rotational adjustment occurs independent of, and without interference with, the relative x magnification direction translational adjustment made between the retainer-held lens 11 and the carrier 14. As seen in FIG. 5, lengthening of the length of screw 41 between the bracket part 39 and the rail surface 24, for example, causes a clockwise shift of the lens 11 in the $\theta_z$ direction relative to the base 12, from a position 11 (shown in solid lines in FIG. 5) to a position 11″ (indicated in dot-dashed lines). Lens 11 can be shifted in the z axis direction for focusing by moving the body member 25 longitudinally within the track 19. Once the z axis translational and $\theta_z$ rotational directional adjustments have been made, the carrier 14 can be potted or clamped to the track 19 by conventional means.

FIGS. 6 and 7 show a modified form 10' of the mount 10. Mount 10' utilizes the z and $\theta_z$ adjustment features of mount 10, but does not have the above-described push-pull retainer mechanism. The carrier 14' of mount 10' has a cavity 100 formed in the front face 28' thereof. The cavity 100 is slightly larger than, but of the same generally rectangular cross-sectional shape, as the lens 11. The cavity 100 is formed with opposite left and right y-z planar sides 101, 102, opposite upper and lower x-z planar sides 103, 104, and an inner x-y planar surface 105. The cavity 100 is machined to ensure that at least one corner (lower right corner in FIG. 7) of the cavity 100 will permit a corresponding corner of lens 11 to be brought into registration with it. For the illustrated embodiment, the cavity 100 is machined so that the adjacent sides 61, 64 of lens 11, oriented at right angles to each other, flush with the corresponding sides 102, 104 of cavity 100, at the same time the lens plano surface 59 is brought flush with the inner surface 105 of the cavity 100. Proper machining of the cavity and edge cutting of the lens will therefore ensure correct positioning of the lens relative to the x, y, $\theta_x$, $\theta_y$ directions. The cylindrical body member 25' of the carrier 14' can then be adjustably located axially along the channel 21 of base 12 to set the desired z direction lens location, and pin 41 can be moved toward/away from the top surface 24 of the rail 20 of base 12 to set the desired $\theta_z$ direction lens position, as before. The position of lens 11 within the cavity 100, and the positions of member 25' and pin 41 can then be fixed by known potting or similar means.

Those skilled in the art to which the invention relates will appreciate that other substitutions and modifications can be made to the described embodiments without departing from the spirit and scope of the invention as described by the claims below.

I claim:

1. A device for positioning a cylindrical lens or the like translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device including a base; a lens carrier mounted on said base; means for angularly positioning said lens relative to said $\theta_x$ and $\theta_y$ directions; means for translationally positioning said lens relative to said other of said x and y axes directions; means for translationally positioning said lens relative to said z axis direction; means for adjustably translationally positioning said lens relative to said one of said x and y directions; and means for adjustably angularly positioning said lens relative to said $\theta_z$ direction; and said device being characterized in that:

said device further comprises a lens retainer for retaining said lens on said carrier, said lens retainer having a recess for receiving a portion of said lens;

a fixture for applying a push-pull mechanism to said retainer to apply a biasing torque on said lens, said torque having a force component in said one of said x and y directions, and for adjustably translationally positioning said lens in said one of said x and y directions relative to said carrier in opposition to said biasing force component; and means mounting said fixture on one of said base and carrier;

said fixture comprising a main body portion, means attached to said main body portion and selectively movable into pushing contact against a first point of said retainer, and means attached to said main body portion and to said retainer at a second point of said retainer removed from said first point in a direction transverse to said one of said x and y directions, said means acting at said second point comprising means for exerting a pulling force on said retainer, to apply a torque on said retainer in the $\theta_z$ direction.

2. A device as in claim 1, wherein said carrier includes first and second guide members spaced in both said one of said x and y directions and in said other of said x and y directions, and said retainer is positioned to place said lens between said guide members so that said applied torque loads said lens against said guide members to resist relative movement of said lens and carrier in said other of said x and y directions.

3. A device as in claim 2, wherein said applied torque functions to bias said lens in said one of said x and y directions, and said means movable into pushing contact against said first point comprises means movable into pushing contact with said first point to adjustably translationally position said lens relative to said carrier in said one of said x and y directions.

4. A device as in claim 1, further comprising means, acting between said carrier and said retainer, for releasibly locking said lens in fixed position relative to said carrier; and wherein said means mounting said fixture enables removal of said fixture from said one of said base and carrier while said lens is locked in said fixed position.

5. A device as in claim 4, wherein said base comprises a track having a V-shaped channel extending in said z axis direction, said carrier comprises a cylindrical body member axially aligned within said channel, and said means for adjustably angularly positioning said lens relative to said $\theta_z$ direction comprises adjustable spacing means, applied between said carrier and said base, for selectively rotating said body member about said z axis direction within said channel.

6. A device for positioning a cylindrical lens or the like translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved cylindrical surface for providing magnification in one of said x and y axes directions; said device including a base; a lens carrier mounted on said base; means for angularly positioning said lens relative to said $\theta_x$ and $\theta_y$ directions; means for translationally positioning said lens relative to said other of said x and y axes directions; means for translationally positioning said lens relative to said z axis direction; means for adjustably translationally positioning said lens relative to said one of said x and y directions; and means for adjustably angularly positioning said lens relative to said $\theta_z$ direction; and said device being characterized in that:

said device further comprises a lens retainer for retaining said lens on said carrier; a fixture for applying a push-pull mechanism to said retainer to apply a biasing torque on said lens, said torque having a force component in said one of said x and y directions, and for adjustably translationally positioning said lens in said one of said x and y directions relative to said carrier i opposition to said biasing force component; and means removably mounting said fixture on one of said base and carrier;

said means for adjustably angularly positioning said lens relative to said $\theta_z$ direction comprises means for selectively rotating said lens carrier in said $\theta_z$ direction relative to said base;

said base comprises a track having a V-shaped channel extending in said z axis direction;

said carrier comprises a cylindrical body member axially aligned within said channel; and said means for selectively rotating said lens carrier relative to said base comprises said base further including a rail having a top surface running alongside said track, and said carrier further including a bracket radially extending from said body member, a member spacing said bracket by a distance from said rail top surface, and means for selectively adjusting the dimension of said spacing distance, whereby said body member is selectively rotated within said channel.

7. A device as in claim 6, wherein said lens retainer has a recess for receiving said lens; and said fixture comprises a main body portion, means attached to said main body portion and selectively movable into pushing contact against a first point of said retainer, and means attached to said main body portion and to said retainer at a second point of said retainer removed from said first point in a direction transverse to said one of said x and y directions, said means acting at said second point comprising means for exerting a pulling force on said retainer, to apply a torque on said retainer in the $\theta_z$ direction.

8. A device as in claim 7, wherein said carrier includes first and second guide members spaced in both said one of said x and y directions and in said other of said x and y directions, and said retainer is positioned to place said lens between sid guide members so that said applied torque loads said lens against said guide members to resist relative movement of said lens and carrier in said other of said x and y directions.

9. A device as in claim 8, wherein said applied torque functions to bias said lens in said one of said x and y directions, and said means movable into pushing contact against said first point comprises means movable into pushing contact with said first point to adjustably translationally position said lens relative to said carrier in said one of said x and y directions.

10. A device for positioning a lens or the like translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved surface for providing magnification in at least one of said x and y axes directions; said device including a base; a lens carrier mounted on said base; means for angularly positioning said lens relative to said $\theta_x$ and $\theta_y$ directions; means for transitionally positioning said lens relative to said x and y axes directions; means for translationally positioning said lens relative to sid z axis direction; and means for adjustably angularly positioning said lens relative to said $\theta_z$ direction; said device being characterized in that:

said device further comprises means for retaining said lens on said carrier;

said base comprises a track having a V-shaped channel extending in said z axis direction;

said carrier comprises a cylindrical body member axially aligned within said channel; and said means for adjustably angularly positioning said lens relative to said $\theta_z$ direction comprises adjustable spacing means, applied between said carrier and said base, for selectively rotating said body member about said z axis direction within said channel.

11. A device for positioning a lens or the like translationally with respect to x, y, z orthogonal axes directions and rotationally with respect to $\theta_x$, $\theta_y$, $\theta_z$ directions respectively angularly about said x, y, z axes directions in an optical system having a source for projecting a beam of light along a path in said z axis direction, onto said lens positioned by said device, and onto a receiving medium; said lens including a curved surface for providing magnification in at least one of said x and y axes directions; said device including a base; a lens carrier mounted on sid base; means for angularly positioning said lens relative to said $\theta_x$ and $\theta_y$ directions; means for translationally positioning said lens relative to said x and y axes directions; means for translationally positioning said lens relative to said z axis direction; and means for adjustably angularly positioning said lens relative to said $\theta_z$ direction; and said device being characterized in that:

said device further comprises means for retaining said lens on said carrier;

said means for adjustably angularly positioning said lens relative to said $\theta_z$ direction comprises means for selectively rotating said lens carrier in said $\theta_z$ direction relative to said base;

said base comprises a track having a V-shaped channel extending in said z axis direction;

said carrier comprises a cylindrical body member axially aligned within said channel; and said means for selectively rotating said lens carrier relative to said base comprises said base further including a rail having a top surface running alongside said track, and said carrier further including a bracket radially extending from said body member, a member spacing said bracket by a distance from said rail top surface, and means for selectively adjusting the dimension of said spacing distance, whereby said body member is selectively rotated within said channel.

12. A device as in claim 11 for positioning a cylindrical lens having a rectangular cross-section and adjacent sides joined at right angles at a corner, wherein said means for retaining said lens on said carrier comprises a cavity formed in said carrier, said carrier having a cross-section larger than said lens and being formed with adjacent sides oriented respectively parallel to the x and y directions against which said lens corner can be registered.

* * * * *